(12) United States Patent
Ahmed

(10) Patent No.: US 10,877,174 B2
(45) Date of Patent: Dec. 29, 2020

(54) DIVING WAVE ILLUMINATION USING MIGRATION GATHERS

(71) Applicant: BP Corporation North America Inc., Houston, TX (US)

(72) Inventor: Imitaz Ahmed, Katy, TX (US)

(73) Assignee: BP Corporation North America Inc., Houston, TX (US)

( * ) Notice: Subject to any disclaimer, the term of this patent is extended or adjusted under 35 U.S.C. 154(b) by 363 days.

(21) Appl. No.: 15/830,626

(22) Filed: Dec. 4, 2017

(65) Prior Publication Data
US 2018/0156931 A1 Jun. 7, 2018

Related U.S. Application Data

(60) Provisional application No. 62/429,541, filed on Dec. 2, 2016.

(51) Int. Cl.
*G01V 1/30* (2006.01)
*G06T 7/55* (2017.01)
(Continued)

(52) U.S. Cl.
CPC .............. *G01V 1/303* (2013.01); *G01V 1/005* (2013.01); *G01V 1/282* (2013.01); *G01V 1/306* (2013.01);
(Continued)

(58) Field of Classification Search
CPC ........ G01V 1/005; G01V 1/282; G01V 1/301; G01V 1/303; G01V 1/306; G01V 1/307;
(Continued)

(56) References Cited

U.S. PATENT DOCUMENTS

| 7,373,252 B2 * | 5/2008 | Sherrill ................... G01V 1/30 702/17 |
| 7,725,266 B2 | 5/2010 | Sirque et al. |
| | | (Continued) |

OTHER PUBLICATIONS

Jeroen Tromp, et al., (2005), "Siesmic tomography, adjoint methods,time reversal and banana-doughnut kernels," Geophys J. Int., 160, pp. 195-216.

(Continued)

*Primary Examiner* — Elias Desta
(74) *Attorney, Agent, or Firm* — Robert Hsiso

(57) ABSTRACT

A technique for estimating a depth of investigation of a seismic survey includes in various aspects a method and an apparatus. The method is for use in seismic exploration and includes: forward modeling on a subsurface attribute model of a subterranean region to generate a set of low frequency seismic data, the subsurface attribute model being generated from data representative of the subterranean region; performing a reverse time migration on the low frequency seismic data to obtain a plurality of gathers with large opening angles; stacking the gathers to yield a diving wave illumination image; and estimating a full-waveform inversion depth of investigation from the diving wave illumination image. The apparatus may include a computing apparatus programmed to perform the method and/or a program storage medium encoded with computing instructions that, when executed, perform the method.

35 Claims, 5 Drawing Sheets

(51) Int. Cl.
    *G01V 1/00*   (2006.01)
    *G01V 1/28*   (2006.01)
    *G01V 1/34*   (2006.01)
    *G01V 1/38*   (2006.01)

(52) U.S. Cl.
    CPC ............ *G01V 1/345* (2013.01); *G01V 1/3808* (2013.01); *G06T 7/55* (2017.01); *G01V 1/301* (2013.01); *G01V 1/307* (2013.01); *G01V 2210/51* (2013.01); *G01V 2210/614* (2013.01); *G01V 2210/6222* (2013.01); *G01V 2210/679* (2013.01)

(58) Field of Classification Search
    CPC .. G01V 1/345; G01V 1/3808; G01V 2210/51; G01V 2210/614; G01V 2210/6222; G01V 2210/679; G06T 7/55
    See application file for complete search history.

(56) References Cited

U.S. PATENT DOCUMENTS

| | | | |
|---|---|---|---|
| 9,651,694 | B2 | 5/2017 | Zhang |
| 2007/0282535 | A1 | 12/2007 | Sirgue et al. |
| 2011/0194379 | A1 | 8/2011 | Lee |
| 2013/0311151 | A1 | 11/2013 | Plessix |
| 2014/0293744 | A1 | 10/2014 | Zhang |
| 2016/0187507 | A1 | 6/2016 | Brenders et al. |
| 2016/0187512 | A1 | 6/2016 | Mothi et al. |
| 2017/0184748 | A1* | 6/2017 | Baydin .................... G01V 1/36 |

OTHER PUBLICATIONS

Colin A. Zelt, (1998). "Lateral velocity resolution from three-dimensional seismic refraction data," Geophys. J. Int., 135, pp. 1101-1112.

Colin A. Zelt, et al., "3D simultaneous seismic refraction and reflection tomography of wide-angle data from the central Chilean margin," Geophysical Research Letters, vol. 26, No. 16, pp. 2577-2580, Aug. 15, 1999.

L. Sirgue, (2006), "The Importance of Low Frequency and Large Offset in Waveform Inversion," presented at the 68th EAGE in Vienna.

Damien Pageot, et al., (2013), "A parametric analysis of two-dimensional elastic full waveform inversion of teleseismic data for lithospheric imaging," Geophys. J. Int., 193, pp. 1479-1505.

Joanna Morgan, et al., (2013), "Next-generation seismic experiments: wide-angle, multi-azimuth, three-dimensional, full-waveform inversion," Geophys. J. Int., 195, pp. 1657-1678.

Antoine Guitton, et al., (2011), "Constrained full-waveform inversion by model reparameterization," Geophysics, vol. 77, No. 2, pp. R117-R127.

D. Baptiste, et al., (2012), "Changing OBC Acquisition Geometry Using FWI Modeling," presented at EAGE in London.

Romain Brossier et al., "Velocity model building from seismic reflection data by full-waveform inversion: Velocity Model building from seismic reflection data," Geophysical Prospecting, vol. 63, No. 2, Nov. 11, 2014, pp. 354-367.

International Patent Application No. PCT/US2017/064506 International Search Report and Written Opinion dated Mar. 15, 2018 (21 pages).

Tian Akela, et al., "Applied 3D Full-Waveform Inversion: Increasing the Resolution and Depth Penetration Supervisors: Professor Mike Disclaimer and Declaration", Oct. 1, 2015.

International Patent Application No. PCT/US2017/064503 Search Report dated Jul. 18, 2018.

International Patent Application No. PCT/US2017/064503 International Search Report dated Mar. 27, 2018.

J. Virieux, et al., "An Overview of full-waveform inversion in exploration geophysics", Geophysicics, Society of Exploration Geophysicists, US, vol. 74, No. Suppl. of 6, Nov. 1, 2009, pp. WCC1-WCC26.

Singapore Search Report and Written Opinion dated Jun. 15, 2020, for Singapore patent application No. 11201909100V, filed Dec. 4, 2017.

* cited by examiner

DIVING WAVE ILLUMINATION USING MIGRATION GATHERS

CROSS-REFERENCE TO RELATED APPLICATIONS

This application claims priority to U.S. Provisional Patent Application No. 62/429,541, filed Dec. 2, 2016. The disclosure of which is hereby incorporated herein by reference in its entirety.

DESCRIPTION OF THE INVENTION

Field of the Invention

The present invention pertains to the evaluation of seismic survey designs and results and, more particularly, the estimation of the depth of investigation in such endeavors.

Background

This section of this document introduces selected portions of the art that may be related to various aspects of the present invention described and/or claimed below. It provides background information to facilitate a better understanding of what is claimed. This is therefore a discussion of "related" art. That such art is related in no way implies that it is also "prior art". The related art may or may not be prior art. This discussion is to be read in this light and not as an admission of prior art.

The pursuit of hydrocarbons is frequently performed through "seismic surveying". In seismic surveying, acoustic signals of seismic frequencies are imparted into the earth using impulse sources, swept sources, or still other kinds of seismic sources. The energy from these signals propagates through the earth and the structure of the earth's subterranean formation(s) alter(s) the signals and their attributes in characteristic ways. The seismic signals are then returned, in part, to the earth's surface through a variety of mechanisms, such as reflection, refraction, etc. The returned signals are received and recorded as seismic data.

The seismic data are representative of the subterranean region through which they propagate because of the characteristic ways in which the formations' structures alter the signals and their attributes. Geophysicists can typically infer the structure of subterranean region from the identified characteristic alterations of the seismic signal.

The analysis by which the geophysicists do this is heavily dependent on computational resources. Seismic data sets are sufficiently large to be beyond manual numerical computation and analysis, so geophysicists call on computers for this task. The data sets are also sufficiently large and the processing sufficiently complex that most numerical tasks are also very computationally expensive. That is, it takes a long time using a lot of computing resources.

Such computational processing is used in many aspects of seismic surveying. For example, the coverage and quality of a seismic survey will depend greatly on the locations of the sources and receivers, also known as the "acquisition geometry", used in conducting the survey. However, seismic surveying is too costly to be performed using trial and error to find a suitable acquisition geometry. So computational processing is sometimes used to evaluate prospective acquisition geometries to determine which might yield the most desirable survey results.

Another example is found in imaging. Seismic data are frequently imaged, or rendered into a representation of the subsurface region, typically for visual inspection. Seismic data imaging is very computationally expensive. The resulting image, however, sometimes does not provide the desired information because of issues with the underlying seismic data that are not apparent before processing.

There are a number of physical attributes of the subsurface formation that are of interest to geophysicists. One such physical attribute is the velocity and it is often examined using a "velocity model." A velocity model is a representation of the subsurface geological formation that can be used in analysis of seismic data. To convert the seismic data into the "seismic image," geophysicists use an analysis of the subsurface velocities. This calculation of the velocity model is also computationally expensive, and its accuracy and precision directly affect the quality of the seismic image.

Another physical attribute of interest in these types of endeavors is the "depth of investigation" ("DOI"). The depth of investigation may be considered to be the depth at which useable information is obtained from a given survey for a given longitudinal and latitudinal coordinate within the subsurface region. It is a function of several well-known parameters such as source and receiver placement, the attributes of the seismic signal, the subsurface velocities, etc.

The acquisition geometry and the subsurface structure can therefore greatly impact the depth of investigation for the survey as a whole. The subsurface structure and the interaction of the seismic signal within the subsurface structure can be quite complex. It will also vary by location within the subsurface formation. The depth of investigation therefore is not so much a number as a function of a number of factors that will vary by location within the subsurface region.

The depth of investigation is typically computationally expensive and ambiguous to determine for any given set of seismic data. In certain cases, one wishes to explicitly know the depth of investigation for one of the previously mentioned parameters, the subsurface velocities. One method used in analyzing seismic data is full-waveform inversion (FWI), which outputs a velocity model to use in calculating the seismic image. Geophysicists sometimes perform an analysis of the depth of investigation of the velocity model from FWI—a factor in the depth of investigation and overall accuracy of the seismic image. FWI is computationally expensive, however, and it is sufficiently expensive that sometimes the depth of investigation is not actually quantitatively determined—it is instead estimated.

One estimation technique used in this context is known as the "one-third maximum offset" rule of thumb. Under this rule, the geophysicist assumes that the FWI depth of investigation to be one-third of the maximum offset between sources and receivers at any given point in the subsurface region. The accuracy of this estimation is sufficient for many contexts, but it is not unusual to find it applied in contexts where it is not appropriate. This rule of thumb estimation technique is, in general, both misused and overused as a technique for estimating the depth of investigation.

BRIEF DESCRIPTION OF THE DRAWINGS

The accompanying drawings, which are incorporated herein and constitute a part of this specification, illustrate embodiments of the invention and together with the description, serve to explain the principles of the invention. In the figures.

DESCRIPTION OF THE EMBODIMENTS

The technique disclosed herein provides a method by which the depth of investigation ("DOI") of a seismic survey may be estimated from survey design parameters and geological models rather in lieu of, or in addition to, the one-third maximum offset rule of thumb. The technique takes advantage of the fact that velocity models from full-waveform inversion ("FWI") are most sensitive to the presence of low-frequency, long-offset, diving wave information recorded in each shot gather. Since the first iteration of FWI is approximately equal to migration, one can approximate the impact of a given acquisition geometry by running a single iteration of reverse-time migration ("RTM") for each shot location, and stacking for a given geometry, as in imaging. By including only the low frequency, diving wave portion of the wavefield from the image gathers, one can evaluate the FWI DOI for a given acquisition geometry.

The technique disclosed herein will be disclosed in the context of a velocity model as is described above. However, the technique is not so limited. Those in the art having the benefit of this disclosure will appreciate that velocity is but one subsurface attribute that is modeled. It is to be understood that the presently disclosed technique may also be applied to subsurface attribute models other than velocity models.

Reference will now be made in detail to the present embodiment(s) (exemplary embodiments) of the invention, an example(s) of which is (are) illustrated in the accompanying drawings. Wherever possible, the same reference numbers will be used throughout the drawings to refer to the same or like parts.

Figure 1:
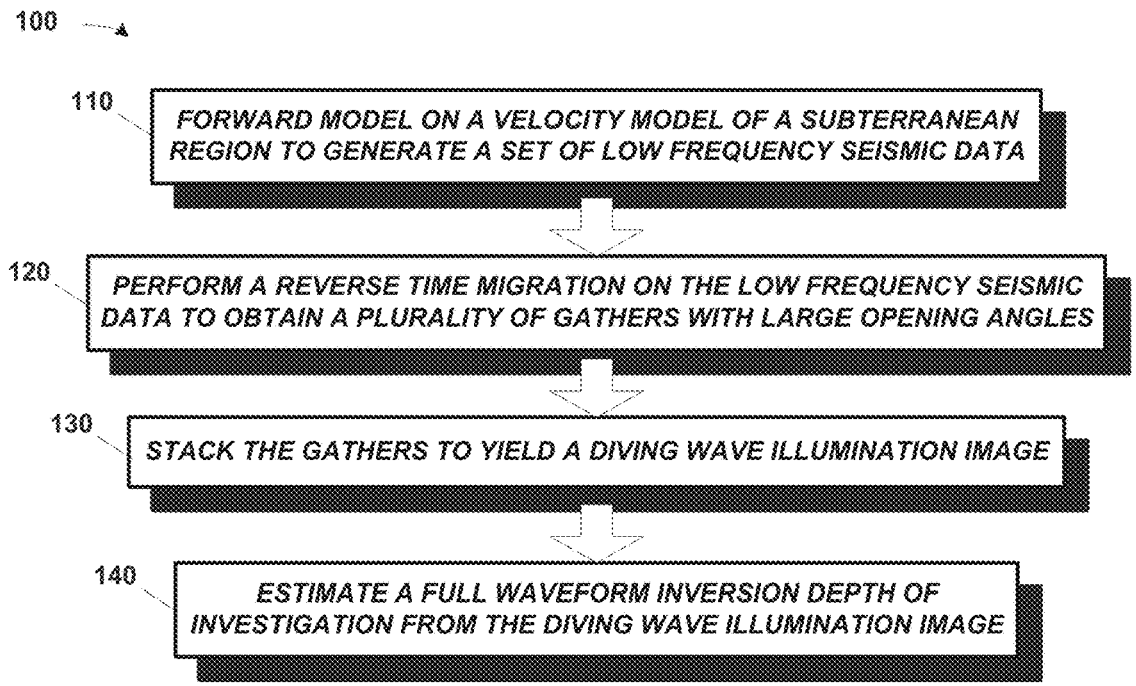
FIG. 1 graphically presents the process flow in the method of the technique disclosed herein.

Turning now to the drawings, a process flow 100 in accordance with one particular embodiment of the present invention is graphically presented in FIG. 1. As will become apparent to those in the art having the disclosure herein, the process flow is largely, and in some embodiments completely, computer-implemented. To that end, FIG. 2A-FIG. 2A present exemplary computing apparatuses by which the computer-implemented aspects of the process flow 100 may be performed.

Figure 2A:
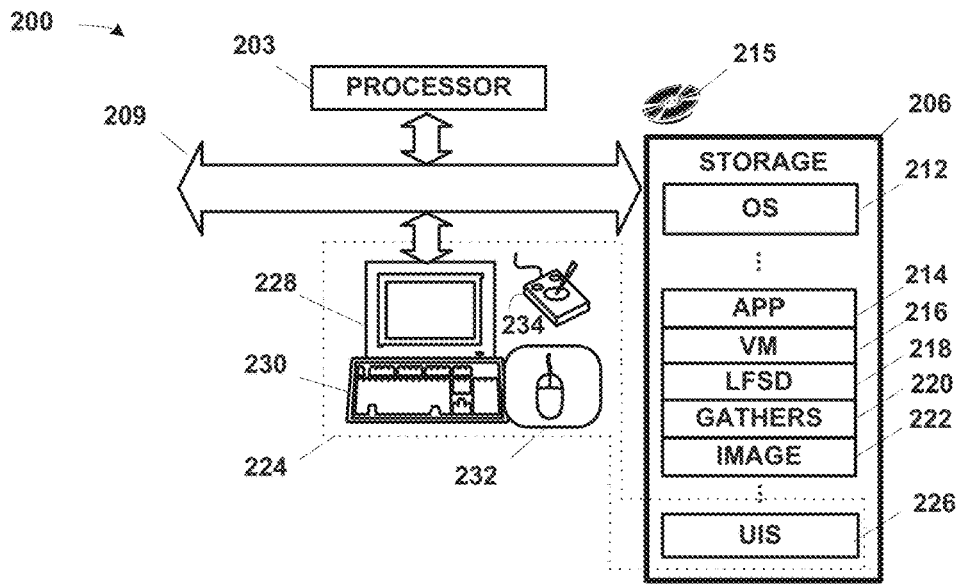
FIG. 2A-FIG. 2B illustrate a computing apparatus that may be used to implement some aspects of the presently disclosed technique.

Referring now to FIG. 2A, selected portions of the hardware and software architecture of a computing apparatus 200 are shown. The computing apparatus 200 may be a general purpose computing apparatus or a dedicated computing apparatus depending upon the particular implementation. The computing apparatus 200 includes at least an electronic processor 203 communicating with storage 206 over a communication medium 209.

The electronic processor 203 may be any suitable processor or processor set known to the art. Those in the art will appreciate that some types of processors will be preferred in various embodiments depending on familiar implementation-specific details. Those in the art will also appreciate that data and data sets such as those used In a process such as the one disclosed herein are quite voluminous and that the processing described herein is computationally intensive. Typical implementations for the electronic processor 203 therefore actually constitute multiple electronic processor sets spread across multiple computing apparatuses working in concert. One such embodiment is discussed below. These considerations affect the implementation of the storage 206 and the communication medium 209 similarly.

The storage 206 may include non-transitory storage media such as a magnetic hard disk and/or random access memory ("RAM") and/or removable storage such as an optical disk 215. The storage 206 is encoded with a number of software components. These components include an operating system ("OS") 212; an application 214; a velocity model ("VM") 216, a data structure in which low frequency seismic data ("LFSD") 218 may be stored; a data structure in which a plurality of gathers 220 may be stored; and a data structure in which an image 222 may be stored. The storage 206 may be distributed across multiple computing apparatuses as described above.

As with the electronic processor 203, implementation-specific design constraints may influence the design of the storage 206 in any particular embodiment. For example, as noted above, the disclosed technique operates on voluminous data sets which will typically mitigate for various types of "mass" storage such as a redundant array of independent disks ("RAID"). Other types of mass storage are known to the art and may also be used in addition to or in lieu of a RAID.

The electronic processor 203 operates under the control of the OS 212 and executes the application 214 over the communication medium 209. This process may be initiated automatically, for example upon startup, or upon user command. User command may be directly through a user interface 224.

The user interface 224 includes user interface software ("UIS") 226 and a display 228. It may also include peripheral input/output ("I/O") devices such as a keypad or keyboard 230, a mouse 232, or a joystick 234. These will be implementation-specific details that are not germane to the presently disclosed technique. For example, some embodiments may forego peripheral I/O devices if the display 228 includes a touch screen. Accordingly, the presently disclosed technique admits wide variation in this aspect of the computing system 200 and any conventional implementation known to the art may be used.

Furthermore, there is no requirement that the functionality of the computing system 200 described above be implemented as disclosed. For example, the application 214 may be implemented in some other kind of software component, such as a daemon or utility. The functionality of the application 214 need not be aggregated into a single software component and may be distributed across two or more software components. Similarly, the data structures may be implemented using any suitable data structure known to the art.

As with the electronic processor 203 and the storage 206, the implementation of the communications medium 209 will vary with the implementation. If the computing system 200 is deployed on a single computing apparatus, the communications medium 209 may be, for example, the bus system of that single computing apparatus. Or, if the computing system 200 is implemented across a plurality of networked computing apparatuses, then the communications medium 209 may include a wired or wireless link between the computing apparatuses. Thus, the implementation of the communications medium 209 will be highly dependent on the particular embodiment in ways that will be apparent to those skilled in the art having the benefit of this disclosure.

As is apparent from the description herein, some portions of the detailed descriptions herein are presented in terms of a software implemented process involving symbolic representations of operations on data bits within a memory in a computing system or a computing device. These descriptions and representations are the means used by those in the art to most effectively convey the substance of their work to others skilled in the art. The process and operation require physical manipulations of physical quantities that will physically transform the particular machine or system on which the manipulations are performed or on which the results are stored. Usually, though not necessarily, these quantities take the form of electrical, magnetic, or optical signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated or otherwise as may be apparent, throughout the present disclosure, these descriptions refer to the action and processes of an electronic device, that manipulates and transforms data represented as physical (electronic, magnetic, or optical) quantities within some electronic device's storage into other data similarly represented as physical quantities within the storage, or in transmission or display devices. Exemplary of the terms denoting such a description are, without limitation, the terms "processing," "computing," "calculating," "determining," "displaying," and the like.

Furthermore, the execution of the software's functionality transforms the computing apparatus on which it is performed. For example, acquisition of data will physically alter the content of the storage, as will subsequent processing of that data. The physical alteration is a "physical transformation" in that it changes the physical state of the storage for the computing apparatus.

Note also that the software implemented aspects of the invention are typically encoded on some form of program storage medium or, alternatively, implemented over some type of transmission medium. The program storage medium may be random access memory ("RAM"), magnetic (e.g., a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The invention is not limited by these aspects of any given implementation.

Figure 2B:
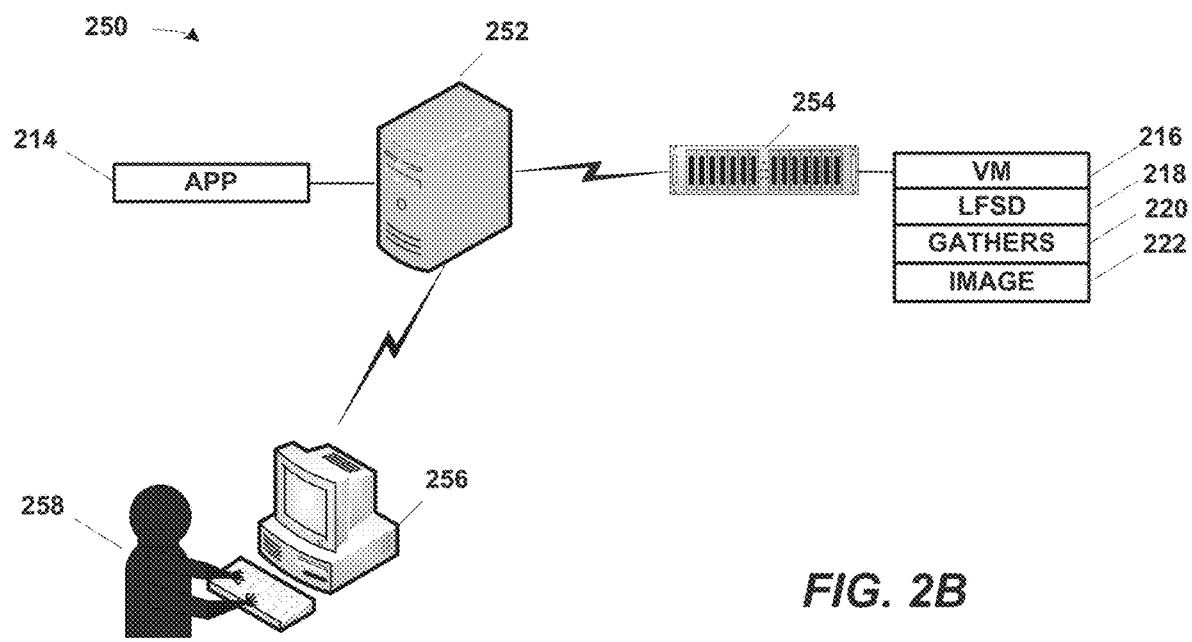

A portion of an exemplary computing system 250 by which such processing occurs in the illustrated embodiment is shown in FIG. 2B. The computing system 250 is networked, but there is no requirement that the computing system 250 be networked. Alternative embodiments may employ, for instance, a peer-to-peer architecture or some hybrid of a peer-to-peer and client/server architecture. The size and geographic scope of the computing system 250 is not material to the practice of the invention. The size and scope may range anywhere from just a few machines of a Local Area Network ("LAN") located in the same room to many hundreds or thousands of machines globally distributed in an enterprise computing system.

The computing system 250 comprises, in the illustrated portion, a server 252, a mass storage device 254, and a workstation 256. Each of these components may be implemented in their hardware in conventional fashion. Alternative embodiments may also vary in the computing apparatuses used to implement the computing system 250. Those in the art will furthermore appreciate that the computing system 250, and even that portion of it that is shown, will be much more complex. However, such detail is conventional and shall not be shown or discussed to avoid obscuring the subject matter claimed below.

In FIG. 2B, the application 214 is shown residing on the server 252 while velocity model 216, low frequency seismic data 218, gathers 220, and image 222 reside in the mass storage 254. While this is one way to locate the various software components, the technique is not dependent upon such an arrangement. Although performance concerns may mitigate for certain locations in particular embodiments, the situs of the software components are otherwise immaterial.

The presently disclosed technique admits some variation in the processing depending on the manner of acquisition and implementation specific goals for the end product. Those in the art will appreciate that there will typically be some degree of pre-processing no matter the processing approach. Such pre-processing will typically be used in various embodiments of the presently disclosed technique. However, due to its ubiquity in the art and the familiarity of those in the art with it, such pre-processing will not be discussed further for the sake of clarity and so as to avoid obscuring the subject matter claimed below.

Referring now to FIG. 1 and to FIG. 2B, the user 258 at the workstation 256 invokes the application 214 to perform the process 100. As mentioned above, the velocity model 216 is presumed to have already been generated at the time the user 258 initiates the process 100. The velocity model 216 is a model of a particular subterranean region of the earth that has already been surveyed or that is going to be surveyed. It is generated using techniques well known to the art. In embodiments in which the velocity model 216 has not previously been generated, it can first be generated using those well-known techniques. Those techniques being well-known to the art, further discussion of the details will be omitted for the sake of clarity and so as to avoid obscuring the instant invention.

The velocity model 216 is generated from data (not shown) representative of the subterranean region of the earth. In the illustrated embodiments, that data is seismic data acquired in a previous seismic survey. Alternative embodiments may use other sources of data for this purpose in lieu of or in addition to seismic data if the seismic data if desired. Such other data sources may include, by way of example, well logs, gravity surveys, electromagnetic surveys, geological inspections, etc. Those in the art having the benefit of this disclosure may recognize still further sources of data that may be suitable for this purpose.

With seismic data of sufficiently low frequencies and sufficiently high signal-to-noise, one technique well known to those in the art for constructing a velocity model from seismic data is full-waveform inversion ("FWI"). In an embodiment, FWI begins at low frequencies (as low as possible) and then adds higher and higher frequencies. The subsurface attribute model, of which velocity is one, thereby slowly comes into focus with progressively finer features being added as the rounds of inversion continue. The velocity model output by each stage of the process then becomes the starting model for the next stage. See L. Sirgue & R. G. Pratt, "Efficient Waveform Inversion and Imaging: A Strategy for Selecting Temporal Frequencies", 69 Geophysics 231 (2004).

The velocity model 216 of the illustrated embodiments is furthermore a "smooth" velocity model. In this context, the term "smooth" indicates that the velocity model has been low-pass filtered such that the velocity scale length is greater than the seismic wavelength of the study. However, such smoothing is not necessary to the practice of the invention in all embodiments. Some alternative embodiments may use a velocity model that has not been smoothed.

Returning to FIG. 1 and FIG. 2A, the process 100 begins by forward modeling (at 110) on the velocity model 216 of the subterranean region to generate a set of low frequency seismic data 218. This forward modeling is, more particularly, what is known as "two-way" forward modeling. In other embodiments, the forward modeling may be "one-way" forward modeling, which is generally regarded as less accurate than two-way modeling. In the present embodiment, however, references to forward modeling are describing two-way modeling. The general concept of two-way forward modeling on a velocity model is, in itself, well known to the art. However, there are at least two distinctions in the present invention from the conventional practice.

One distinction is that the forward modeling (at 110) is performed selectively with one or more particular acquisition geometries—or locations of sources and receivers. The selection of the acquisition geometry will depend upon the embodiment as the FWI DOI is dependent upon the acquisition geometry. Some embodiments may estimate an FWI DOI for a seismic survey that has already been performed. These embodiments will use the actual acquisition geometry deployed during the acquisition. The process may also be used to estimate a DOI for a proposed survey. In such embodiments, several proposed acquisition geometries may be used to determine which yields the best FWI DOI for the subterranean region of interest.

A second distinction is that the emulated seismic signals used in the forward modeling (at 110) will be tailored to produce low frequency seismic data. Those in the art will appreciate that a seismic survey, or the forward modeling of one, will typically include a range of frequencies in the resultant seismic data. For example, one embodiment uses a range of frequencies spanning three octaves, up to frequencies of interest capable of resolving subsurface structures at tens of meters resolution. Those in the art will also appreciate that forward modeling is computationally expensive, and restricting the forward modelling to low frequency seismic data will speed up the forward modelling process. The presently claimed process operates on low frequency seismic data, and so the seismic signals used in the forward modeling (at 110) may accordingly be tailored, reducing the overall computational cost of the forward modelling (at 110).

Within the context of the present disclosure, the term "low frequency" generally means 2 Hz-6 Hz. In theory, the claimed process may use lower than 2 Hz. However, due to recognized geophysical limitations and instrumentation issues seismic sources in the field rarely go lower than 2 Hz. The claimed process may use frequencies higher than 6 Hz, but the estimated FWI DOI is limited by this frequency and the higher the frequency, generally the shallower the estimated FWI DOI.

There consequently may be unusual circumstances where the "low frequency" of the modeled seismic data falls outside the range of 2 Hz-6 Hz. For example, the seismic data may be known to be particularly free of noise so that frequencies lower than 2 Hz may be used. Similarly, technology may advance to the point where seismic frequencies less than 2 Hz are readily achievable in the field. Or, one might be testing for a particularly shallow FWI DOI, in which case frequencies higher than 6 Hz might be used. However, it is anticipated that most embodiments will employ "low frequencies" in the range of 2 Hz-6 Hz.

Either way, in the context of "low frequencies" the term "approximately" means that the numerical quantification is within the margin of error acceptable within the industry. For example, it is well known that during the course of a survey instrument settings and measurements may vary for a variety of reasons. Thus, a frequency of "approximately 2 Hz" includes frequencies that are not precisely 2.0 Hz but includes frequencies that vary slightly within acceptable margins of error. Similarly, a frequency range of approximately 2 Hz-6 Hz" may include frequencies outside the range of 2.0 Hz-6.0 Hz provided they are within acceptable margins of error. What constitutes an "acceptable margin of error" will depend on circumstance readily apparent to those skilled in the art having the benefit of this disclosure.

The claimed process is independent of the type of modeled sources and the signals they impart. The emulated sources may be impulse sources, swept sources, or any other kind of source known to the art. As those in the art having the benefit of this disclosure will appreciate, each of these kinds of modeled sources will produce a different kind of signal. The claimed process may be used with each of them.

Returning to FIG. 1, the process 100 continues by performing (at 120) a reverse time migration on the low frequency seismic data yielded by the forward modeling (at 110). The object of this reverse time migration is to obtain (at 120) a plurality of image gathers with large opening angles. Reverse time migration is, in itself, well known to the art although its use in this context is not. It is anticipated that embodiments of the claimed process will use reverse time migration techniques that discriminate between gathers with large opening angles and those that do not. One such technique is disclosed in U.S. Patent Publication 2014/0293744, entitled, "Specular Filter (SF) and Dip Oriented Partial Imaging (DOPI) Seismic Migration", filed Mar. 31, 2014, in the name of the inventor Qie Zhang and commonly assigned herewith.

Figure 3:
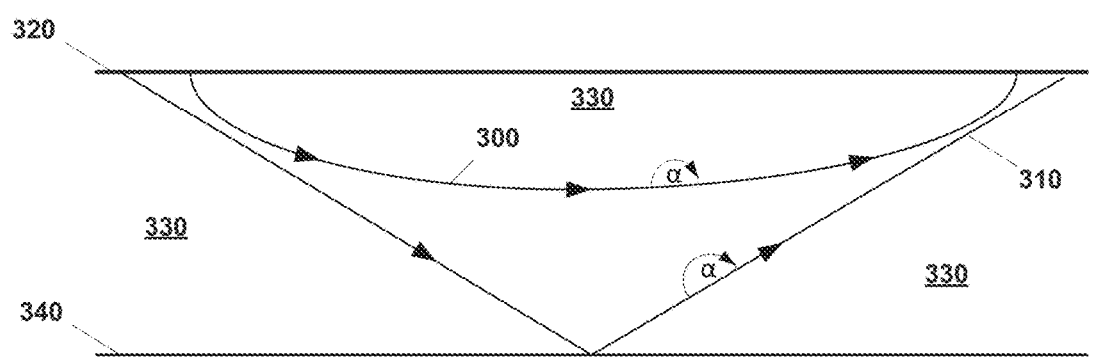
FIG. 3 presents some concepts associated with the claimed subject matter in the context of an exemplary seismic survey.

Within the context of this disclosure, "large opening angles" means those that equal or exceed approximately 160°. This will typically include, as shown in FIG. 3, what are known to the art as "diving waves" 300 and backscattered energy 310. Diving waves 300 are those waves that are refracted rather than reflected to the earth's recording surface 320. Changes in the seismic velocity characteristic of the subterranean formation 330 gradually change the direction of propagation for the energy to redirect it from a downward trajectory to an upward one. The opening angle is equal to 180° along the path of the diving waves. The backscattered energy 310 results from reflection at a reflector 340 in the subterranean formation 330. The opening angle along the backscattered wave path 310 has an opening angle of 180°.

In this context, "approximately" means that the precise measurement for what constitutes a "large opening angle" may vary to some degree depending upon the accuracy of the reverse time migration algorithm. In this circumstance, one might relax the standard of ≥160° to include that substantial amount of energy that is close to this angle even if not exactly what is desired. Thus, some embodiments may relax the standard in order to capture that energy. Those in the art having the benefit of the disclosure herein will be able to readily exercise such personal judgment in implementing the claimed process.

As noted above, it is contemplated that most embodiments will utilize reverse time migration ("RTM") techniques that will discriminate for and yield gathers with large opening angles. Reverse time migration is an example of wavefield-based migration, where wavefields are generated and used to form a seismic image by forward modeling a wavefield (or source wavefield), back-propagating a set of recorded seismic data using the same forward modeling engine (the receiver wavefield), and application of an imaging condition, such as a zero lag cross-correlation between the source and receiver wavefields. Wavefield-based migration methods are generally considered desirable in a subterranean region that is geologically complex and contains steeply dipping geological structures. Though computationally more expensive than ray-based migration, RTM produces a more accurate seismic image.

Returning to FIG. 1, the process 100 then continues by stacking (at 130) the image gathers with large opening angles to yield a diving wave illumination image. Note that the diving wave illumination image contains not only the diving waves, but also the backscattered energy whose opening angles are ≥160° as discussed above. Stacking itself is well known in the art, although its use in this context is not. It comprises a summation of the gathers to generate the diving wave illumination image.

The process 100 then concludes by estimating (at 140) a full-waveform inversion depth of investigation ("DOI") from the diving wave illumination image. This will typically include rendering the diving wave illumination image for visual inspection. Those in the art will appreciate that the DOI is not a number, but is rather a function. Typically, the user would like to evaluate if the FWI DOI for a given seismic acquisition is sufficient to investigate the area of interest in the subsurface. Those in the art having the benefit of this disclosure will be able to judge the answer to this inquiry from visual inspection of the diving wave illumination image. However, some embodiments may choose to implement this step with computing technology.

To further an understanding of the subject matter claimed below, a specific example will now be presented. This particular embodiment evaluates acquisition geometries for a new survey of a subterranean region that has already been surveyed. The purpose of this subsequent survey is to obtain additional information about the subterranean region that was not acquired in the previous survey.

Figure 4:
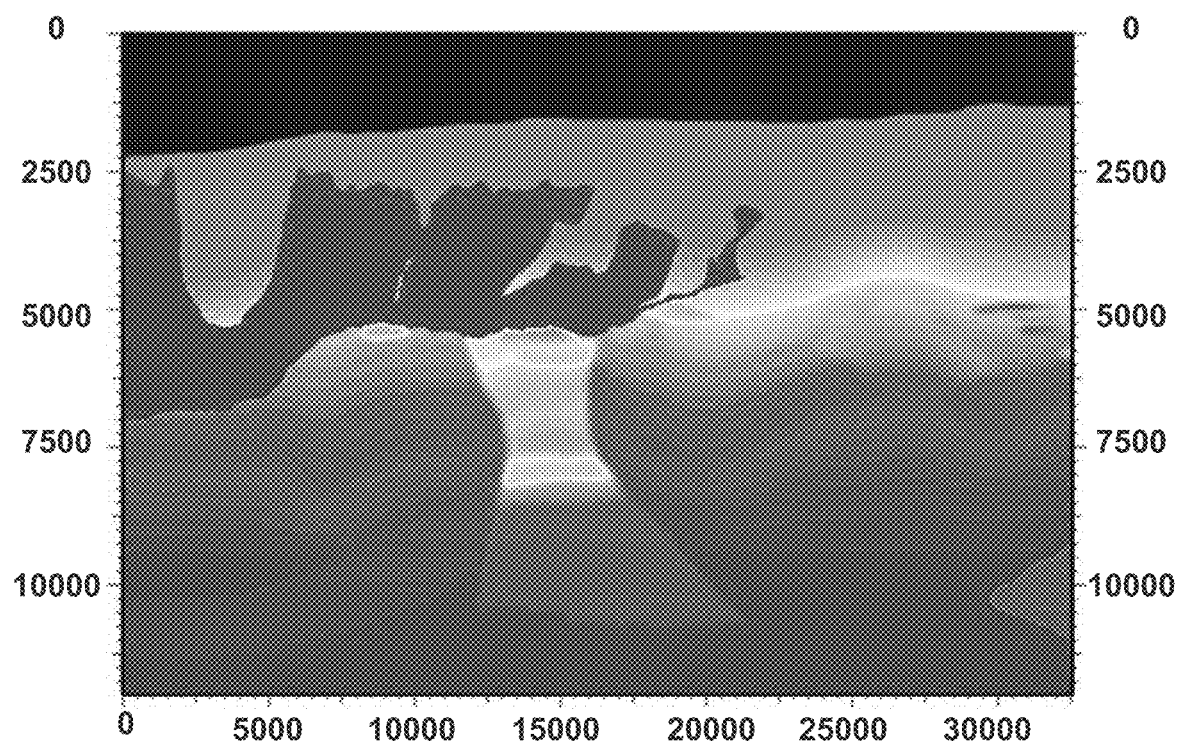
FIG. 4 is a graphical rendering of an exemplary velocity model as may be used in some embodiments of the present invention.

One concern in designing the new survey is ensuring that its coverage includes a specific area of interest within the subterranean region. As noted above, one aspect of the coverage is the FWI depth of investigation ("DOI") and one factor in the DOI is the acquisition geometry. Since the subterranean region has previously been surveyed, there exists a legacy velocity model for the subterranean region. This legacy velocity model was generated and smoothed in accordance with conventional practice. The legacy velocity model for this particular embodiment is shown in FIG. 4. Since the legacy velocity model is already available, and since the acquisition geometry affects the coverage (including the DOI), it would be desirable to test various possible acquisition geometries on the legacy velocity model for their coverage and DOI.

In conventional practice the DOI of FWI could be determined by performing a three-dimensional ("3D") full-waveform inversion ("FWI") on the legacy velocity model and then examining the results to determine the depth to which the velocity model is updated. However, the computational expense of running 3D FWI normally precludes it from being used to analyze the impact of different 3D seismic acquisition geometries on the velocity model calculated by FWI. That is the reason for the prevalence of the one-third maximum offset rule of thumb for determining the FWI DOI of the proposed acquisition geometry.

In contrast, the process claimed below can be used to analyze the impact of different 3D seismic acquisition geometries on the resulting subsurface velocity model. It is also computationally relatively inexpensive. By completing one run each of the modeling and shot-based imaging per shot, any desired acquisition geometry can be evaluated by a simple summation (or, "stack") of a subset of individually migrated shot gathers, corresponding to the geometry under investigation. The imaging process is linear, whereas FWI is non-linear, iterative process.

This particular embodiment generates forward model data only at frequencies lower than 6 Hz and calculates a reverse time migration ("RTM") image with only the portion of angle gathers with large opening angles ≥160°. That is, this embodiment includes only data in the RTM which satisfies the opening angle imaging condition that approximates that for diving waves. (Note that this will include not only diving waves, but also some backscattered energy as discussed above.) It discriminates these large angles by calculating the angle gathers in RTM using the optical flow method disclosed in the aforementioned U.S. Patent Publication 2014/0293744. For a given acquisition geometry, the corresponding stack of these low frequency, large angle gathers is termed the Diving Wave illumination ("DWI") image, which approximates the DOI of FWI for this same acquisition geometry.

Figure 5:
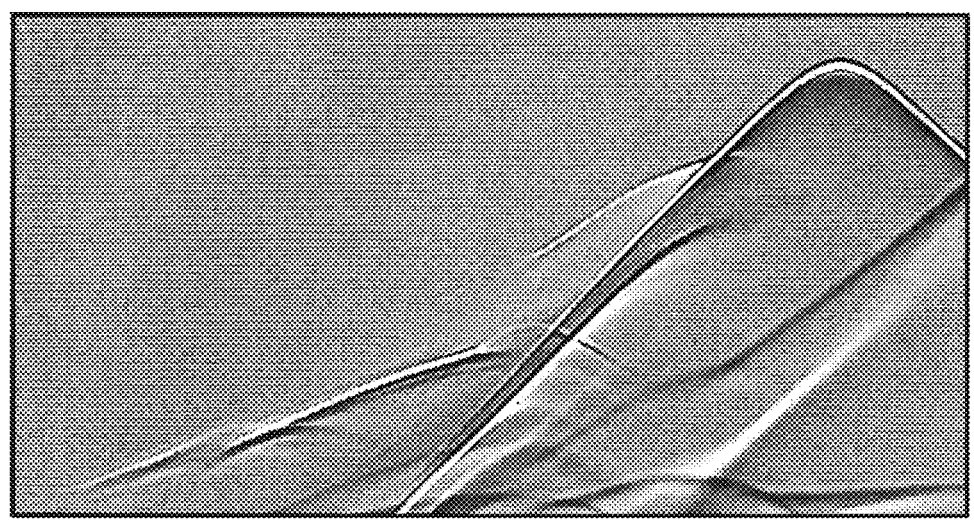
FIG. 5 is a graphical rendering of synthetic forward modelled, low frequency data obtained from the velocity model of FIG. 4.
Figure 6:
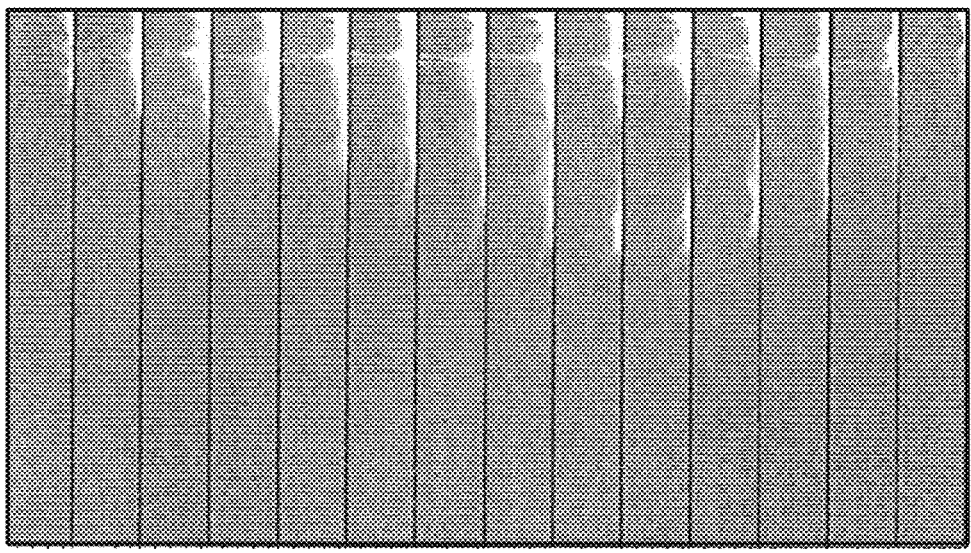
FIG. 6 is a graphical rendering of angle gathers obtained by reverse time migration of the low frequency data of FIG. 5. The opening angles of the gather increases from left to right within a panel.
Figure 7A:
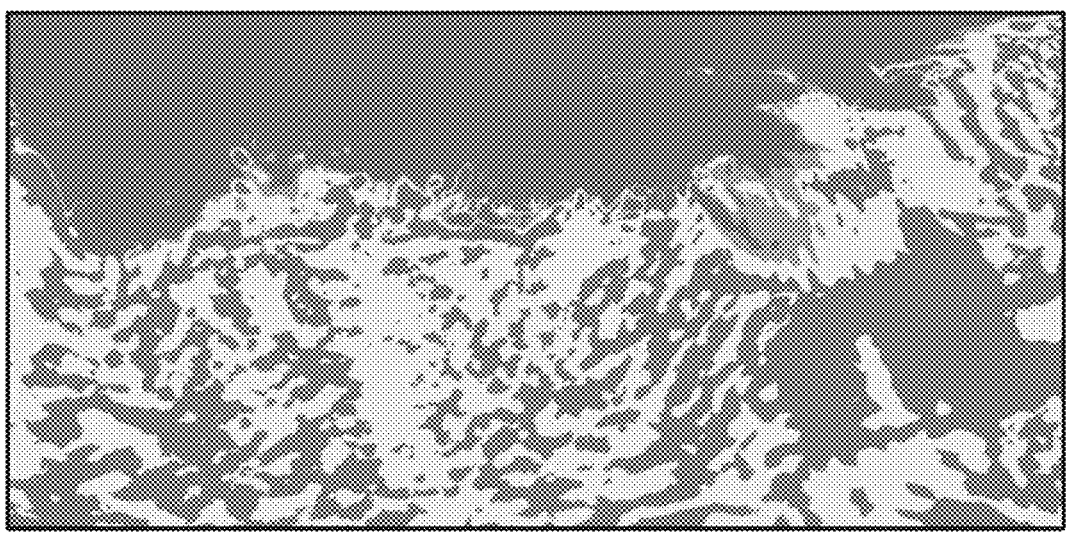
FIG. 7A-FIG. 7C are graphical renderings of diving wave illuminations obtained from the large angle gathers of FIG. 6 for maximum offsets of 8 km, 12 km, and 15 km respectively.
Figure 7B:
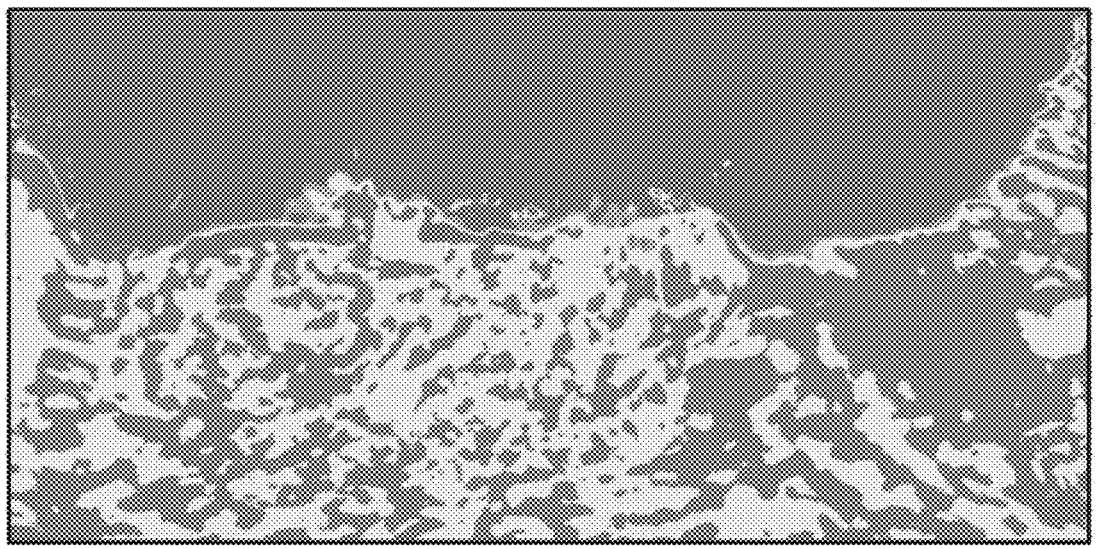
Figure 7C:
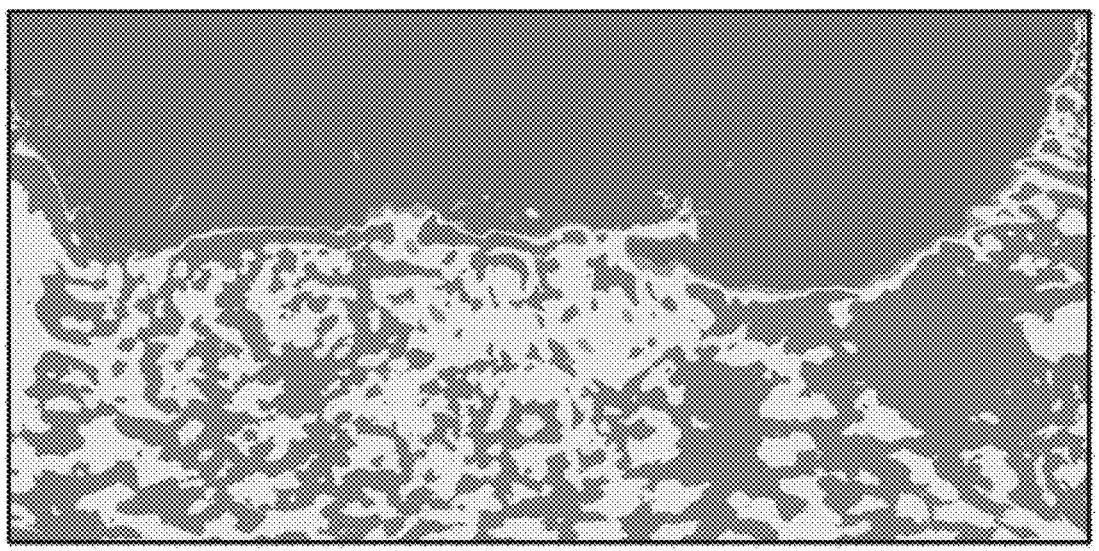

Essentially, in this embodiment there is a three step process to obtain the DWI image as illustrated in FIG. 1. It begins by forward modeling (at 110) on a smooth velocity model to generate low-frequency (2-6 Hz) data, such as that shown in FIG. 5. It proceeds by running (at 120) low-frequency RTM (2-6 Hz), including calculating angle gathers by the optical flow technique disclosed above. FIG. 6 is a graphical rendering of angle gathers obtained by reverse time migration of the low frequency data of FIG. 5 in this embodiment. It then generates a stack (at 130) of the portion of the angle gathers with large opening angles. This stack is the DWI Image, which approximates the FWI DOI for a given acquisition geometry. FIG. 7A-FIG. 7C are graphical renderings of diving wave illumination images obtained from the large angle gathers of FIG. 6 for maximum offsets of 8 km, 12 km, and 15 km respectively.

The FWI DOI for the particular acquisition geometry used to obtain the DWI image can then be estimated from visual inspection of graphical renderings such as those in FIG. 7A-FIG. 7C. Consider, for example, the DWI image in FIG. 7A. The dark areas of the image contain useful information and so the FWI DOI for this particular embodiment with maximum offsets of 8 km (FIG. 7A) can be considered to be the demarcation between the dark and light areas of the image. Note that the DOI changes with the distance of the maximum offset as shown by comparing FIG. 7A-FIG. 7C with each other.

This process can then be used with each of several proposed acquisition geometries to see which of those geometries will yield a desirable DOI. In cases where multiple acquisition geometries meet this desired standard, the user may pick one or more that appear to produce the most desirable results. This approach achieves this desirable end without incurring the full cost of an FWI for even one of the acquisition geometries. It also helps ensure that the proposed survey will achieve desirable results with respect to DOI without having to actually engage in the survey.

Note, however, that this particular embodiment is only one example of how the process for estimating the DOI of a seismic survey may be used. In this particular embodiment, the objective is to evaluate potential acquisition geometries for a survey to be conducted. But other uses are alluded to above.

For example, perhaps a survey of a subterranean region has already been conducted and the geophysicist wants to know whether the DOI is sufficient for FWI to resolve a particular area in which they are interested. This knowledge may be useful for, among other things, to inform the decision of whether to run a computationally expensive full 3D FWI on the seismic data.

One approach would be to run the 3D FWI and see if the DOI suffices. However, this does the geophysicist little good if the DOI is insufficient. The geophysicist might also resort to the one-third maximum offset rule of thumb, but this lacks accuracy and precision and does not account for subsurface geology. The presently claimed technique, however, remedies the drawbacks to both these issues.

Still other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A process for use in seismic exploration, comprising:
for a plurality of different acquisition geometries:
performing forward modeling on a subsurface attribute model of a subterranean region to generate a set of low frequency seismic data, the subsurface attribute model being based on data representative of the subterranean region;
performing a reverse time migration on the low frequency seismic data to obtain a plurality of gathers with large opening angles; and
stacking the gathers with large opening angles to yield a diving wave illumination image; and
estimating a full-waveform inversion depth of investigation from the diving wave illumination image based on the diving wave illumination image of the different acquisition geometries, wherein the full-waveform inversion depth of investigation is associated with a proposed acquisition geometry of the different acquisition geometries;
wherein at least one of the forward-modeling, performing, stacking, and estimating are performed by a processor.

2. The process of claim 1, further comprising:
validating an updated subsurface attribute model using the full-waveform inversion depth of investigation,
providing an enhanced seismic image of the subterranean region using the updated subsurface attribute model; and
using the enhanced seismic image of the subterranean region to explore for hydrocarbons.

3. The process of claim 1, wherein the subsurface attribute model is a smooth subsurface attribute model.

4. The process of claim 1, wherein the low frequency seismic data are between approximately 2 Hz-6 Hz.

5. The process of claim 1, wherein the large opening angles comprise angles greater than approximately 160°.

6. The process of claim 1, wherein the data representative of the subterranean region is a set of seismic data.

7. The process of claim 1, wherein the estimated depth of investigation is for the proposed acquisition geometry, and wherein the proposed acquisition geometry is based on a position of a source and a position of a receiver.

8. The process of claim 1, wherein the subsurface attribute model is a velocity model.

9. A process for use in seismic surveying, comprising:
for a plurality of different acquisition geometries:
obtaining a set of synthetic, low frequency seismic data representative of a subterranean region, including:
obtaining a subsurface attribute model of the subterranean region, the subsurface attribute model being based on data representative of the subterranean region; and
performing forward modeling on the subsurface attribute model using a respective acquisition geometry to generate the low frequency seismic data; and
imaging the low frequency seismic data, including:
performing a reverse time migration on the low frequency seismic data to obtain a plurality of gathers with large opening angles; and
stacking the gathers with large opening angles to yield a diving wave illumination image; and
estimating a full-waveform inversion depth of investigation from the diving wave illumination image based on the diving wave illumination image of the different acquisition geometries, wherein the full-waveform inversion depth of investigation is associated with a proposed acquisition geometry of the different acquisition geometries.

10. The process of claim 9, wherein the low frequency seismic data are between approximately 2 Hz-6 Hz.

11. The process of claim 9, wherein the estimated depth of investigation is for the proposed acquisition geometry, and wherein the proposed acquisition geometry is based on a position of a source and a position of a receiver.

12. The process of claim 9, wherein the forward modeling is based on an actual acquisition geometry for sources and receivers that was used to acquire a set of seismic data from which the subsurface attribute model was constructed.

13. The process of claim 9, wherein the reverse time migration comprises an optical flow reverse time migration.

14. The process of claim 9, wherein the large opening angles comprise angles greater than approximately 160°.

15. A process for use in evaluating a seismic data processing strategy, comprising:
for a plurality of different acquisition geometries:
performing forward modeling on a subsurface attribute model of a subterranean region to generate a set of low frequency seismic data, the subsurface attribute model being based on a seismic data set representative of the subterranean region;
performing a reverse time migration on the low frequency seismic data to obtain a plurality of gathers with large opening angles; and stacking the gathers with large opening angles to yield a diving wave illumination image;
estimating a depth of investigation from the diving wave illumination image based on the diving wave illumination image of the different acquisition geometries, wherein the full-waveform inversion depth of investigation is associated with a proposed acquisition geometry of the different acquisition geometries; and
determining from the estimated full-waveform inversion depth of investigation whether the seismic data processing strategy is likely to yield an acceptable product.

16. The process of claim 15, further comprising:
validating an updated subsurface attribute model using the full-waveform inversion depth of investigation, and
providing an enhanced seismic image of the subterranean region using the updated subsurface attribute model.

17. The process of claim 15, wherein the low frequency seismic data are between approximately 2 Hz-6 Hz.

18. The process of claim 15, wherein the forward modeling includes a proposed acquisition geometry for sources and receivers.

19. The process of claim 15, wherein the forward modeling is based on an actual acquisition geometry for sources and receivers that was used to acquire a set of seismic data from which the subsurface attribute model was constructed.

20. The process of claim 15, wherein the large opening angles comprise angles greater than approximately 160°.

21. A process for use in seismic exploration, comprising:
for a plurality of different acquisition geometries:
performing forward modeling on a velocity model of a subterranean region to generate a set of synthetic, low frequency seismic data, the velocity model being based on data representative of the subterranean region;
performing a reverse time migration on the low frequency seismic data to obtain a plurality of gathers with large opening angles; and
stacking the gathers with large opening angles to yield a diving wave illumination image; and
estimating a full-waveform inversion depth of investigation from the diving wave illumination image based on the diving wave illumination image of the different acquisition geometries, wherein the full-waveform inversion depth of investigation is associated with a proposed acquisition geometry of the different acquisition geometries.

22. The process of claim 21, wherein the low frequency seismic data are between approximately 2 Hz-6 Hz.

23. The process of claim 21, wherein the forward modeling includes a proposed acquisition geometry for sources and receivers.

24. The process of claim 21, wherein the forward modeling is based on an actual acquisition geometry for sources and receivers that was used to acquire a set of seismic data from which the velocity model was constructed.

25. The process of claim 21, wherein the gathers include diving waves and backscattered energy.

26. The process of claim 21, wherein the large opening angles comprise angles greater than approximately 160°.

27. A process for use in seismic surveying, comprising:
for a plurality of different acquisition geometries:
obtaining a velocity model of the subterranean region, the velocity model being based on data representative of the subterranean region; and
forward modeling on the velocity model using a respective acquisition geometry to generate the low frequency seismic data; and
imaging the low frequency seismic data, including:
performing a reverse time migration on the low frequency seismic data to obtain a plurality of gathers with large opening angles; and
stacking the gathers with large opening angles to yield a diving wave illumination image; and
estimating a full-waveform inversion depth of investigation from the diving wave illumination image based on the diving wave illumination image of the different acquisition geometries, wherein the full-waveform inversion depth of investigation is associated with a proposed acquisition geometry of the different acquisition geometries.

28. The process of claim 27, wherein the low frequency seismic data are between approximately 2 Hz-6 Hz.

29. The process of claim 27, wherein the forward modeling includes a proposed acquisition geometry for sources and receivers.

30. The process of claim 27, wherein the forward modeling includes an actual acquisition geometry for sources and receivers that was used to acquire a set of seismic data from which the velocity model was constructed.

31. The process of claim 27, wherein the large opening angles comprise angles greater than approximately 160°.

32. A process for use in evaluating a proposed seismic survey plan, comprising:
for a plurality of different acquisition geometries:
obtaining a velocity model of geological region to be seismically surveyed using data representative of the subterranean region;
performing forward modeling on the velocity model with a respective acquisition geometry defining the source and receiver locations to generate a set of synthetic, low frequency seismic data;
performing a reverse time migration on the low frequency seismic data to obtain a plurality of gathers with large opening angles; and
stacking the gathers with large opening angles to yield a diving wave illumination image; and
estimating a full-waveform inversion depth of investigation for a survey of the subterranean region based on the diving wave illumination image of the different acquisition geometries, wherein the full-waveform inversion depth of investigation is associated with a proposed acquisition geometry of the different acquisition geometries.

33. The process of claim 32, wherein the low frequency seismic data are between approximately 2 Hz-6 Hz.

34. The process of claim 32, wherein the gathers include diving waves and backscattered energy.

35. The process of claim 32, wherein the large opening angles comprise angles greater than approximately 160°.

* * * * *